United States Patent
Bennett, III et al.

(10) Patent No.: US 8,151,325 B1
(45) Date of Patent: Apr. 3, 2012

(54) OPTIMIZING DEVICE AUTHENTICATION BY DISCOVERING INTERNET PROTOCOL VERSION AUTHORIZATIONS

(75) Inventors: John H. Bennett, III, Lawrence, KS (US); Jeremy R. Breau, Leawood, KS (US); Brent B. Hirschman, Overland Park, KS (US); Terry D. Nebergall, Gardner, KS (US); Frederick C. Rogers, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 626 days.

(21) Appl. No.: 12/362,146

(22) Filed: Jan. 29, 2009

(51) Int. Cl.
*H04L 29/06* (2006.01)
(52) U.S. Cl. ......... 726/4; 726/3; 726/5; 726/6; 713/168; 713/169; 713/170; 713/171
(58) Field of Classification Search ................ 726/4
See application file for complete search history.

(56) References Cited

U.S. PATENT DOCUMENTS

| | | | |
|---|---|---|---|
| 6,928,066 B1 * | 8/2005 | Moon et al. | 370/342 |
| 7,103,662 B2 * | 9/2006 | Ray et al. | 709/225 |
| 2003/0092444 A1 * | 5/2003 | Sengodan et al. | 455/436 |
| 2008/0104678 A1 * | 5/2008 | Hsu | 726/4 |

* cited by examiner

*Primary Examiner* — Longbit Chai (57) ABSTRACT

Methods and computer-readable media are provided to enable an Internet protocol (IP) data session to be established between a mobile device and a telecommunications network. To establish an IP data session, it may be determined, prior to authenticating the device, whether the device is authorized to communicate via IPv4, IPv6, or both. A mobile device may be capable of communicating via both IPv4 and IPv6, such as a dual-stack device, but the device may only be authorized for either IPv4 or IPv6. A request to establish the IP data session may first be received from a mobile device, and an IP version with which the mobile device is authorized to communicate may then be determined by querying a customer-profile database. This authorization information may be communicated to an authentication component that authenticates the devices, and subsequently, an IP data session is initiated.

20 Claims, 4 Drawing Sheets

OPTIMIZING DEVICE AUTHENTICATION BY DISCOVERING INTERNET PROTOCOL VERSION AUTHORIZATIONS

SUMMARY

The present invention is defined by the claims below. This summary is provided to introduce a selection of concepts in a simplified form that are further described below in the Detailed Description. This summary is not intended to identify key features or essential features of the claimed subject matter, nor is it intended to be used as an aid in isolation to determine the scope of the claimed subject matter.

Embodiments of the present invention provide methods and computer-readable media for, among other things, determining which IP version(s) with which a mobile device is authorized to communicate. With the increase in devices capable of communicating with IPv6, in addition to the increase of devices that are dual-stack, such as those that are capable of communicating with both IPv4 and IPv6, an embodiment of the present invention allows for increased efficiency in the authentication process. Instead of waiting until later in the authentication process to determine which IP version(s) the device is authorized for, embodiments of the present invention allow for the retrieval of this information near the beginning of the authentication process, so that only those authentication steps are taken for the IP version(s) for which the device is authorized. In one instance, a device may be capable of both IPv4 and IPv6, but may only be authorized for IPv4. In this case, the authentication component may take only those steps necessary to authenticate the device for IPv4, thus eliminating unnecessary resources attempting to authenticate the device for IPv6 when the device is not authorized for IPv6.

Accordingly, in one aspect, one or more computer-readable media having computer-useable instructions embodied thereon for performing a method for enabling a mobile device to establish an Internet protocol (IP) data session through a telecommunications network is provided. The media includes receiving a request from the mobile device to establish the IP data session through the telecommunications network, and determining an IP version by which the mobile device is authorized to communicate data. The determining includes receiving a request to authenticate the mobile device, and inspecting authorization information in a customer-profile database to determine whether the mobile device is authorized to communicate data via IPv4, IPv6, or both. Further, the media includes communicating the authorization information to an authentication component that authenticates the mobile device based on whether the mobile device is authorized to communicate the data via IPv4, IPv6, or both. Additionally, the media includes receiving the data from the mobile device, which the data is passed through the telecommunications network via IPv4, IPv6, or both, depending on the authorization information.

In another aspect, one or more computer-readable media having computer-useable instructions embodied thereon for performing a method for enabling a mobile device to establish an Internet protocol (IP) data session through a telecommunications network is provided. The media includes communicating a request to an authentication component to establish an IP data session through the telecommunications network. The authentication component determines an IP version by which the mobile device is authorized to communicate data by inspecting authorization information in a customer-profile database to determine whether the mobile device is authorized to communicate data via IPv4, IPv6, or both, and communicating the authorization information to an authentication component that authenticates the mobile device based on whether the mobile device is authorized to communicate the data via IPv4, IPv6, or both. The media further includes establishing a connection with a packet-routing component that allows for an establishment of the IP data session, wherein the packet-routing component has been sent and has cached the authorization information. Additionally, the media includes receiving an acknowledgment that the IP data session has been established through the telecommunications network.

In a further aspect, one or more computer-readable media having computer-useable instructions embodied thereon for performing a method for enabling a mobile device to establish an Internet protocol (IP) data session through a telecommunications network is provided. The media includes receiving a request from the mobile device to establish the IP data session through the telecommunications network, wherein the media includes determining an IP version by which the mobile device is authorized to communicate data. The determining includes communicating the request to a querying component that inspects authorization information in a customer-profile database to determine whether the mobile device is authorized to communicate data via IPv4, IPv6, or both, receiving the authorization information from the querying component, and authenticating the mobile device based on the authorization information. The media additionally includes communicating the authorization information to a packet-routing component that caches the authorization information so that the authorization information can be used during the IP data session through the telecommunications network, and receiving the data from the mobile device, which the data is passed through the telecommunications network via IPv4, IPv6, or both, depending on the authorization information.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The subject matter of the present invention is described with specificity herein to meet statutory requirements.

Although the terms "step" and/or "block" may be used herein to connote different components of methods employed, the terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

- 3G Third-Generation Wireless Technology
- 4G Fourth-Generation Cellular Communication System
- AAA Authentication, Authorization, and Accounting
- AN-AAA Access Network Authentication, Authorization, and Accounting
- BSC Base Station Controller
- BTS Base Transceiver Station
- CD-ROM Compact Disk Read Only Memory
- CDMA Code Division Multiple Access
- CHAP Challenge Handshake Authentication Protocol
- DNS Domain-Name System
- DSL Digital Subscriber Line
- DVD Digital Versatile Discs
- EEPROM Electrically Erasable Programmable Read Only Memory
- FAX Facsimile
- GGSN GPRS Gateway Support Node
- GSM Global System for Mobile Communications
- IP Internet Protocol
- IPv4 Internet Protocol Version 4
- IPv6 Internet Protocol Version 6
- LAN Local Area Network
- LCP Link Control Protocol
- MIPv4 Mobile Internet Protocol Version 4
- PDA Personal Digital Assistant
- PDSN Packet Data Serving Node
- PPP Point-to-Point Protocol
- RAM Random Access Memory
- RNC Radio Network Controller
- ROM Read Only Memory
- TV Television
- TDMA Time Division Multiple Access
- WI-FI Wireless Interface of Mobile Computing Devices
- WIMAX Worldwide Interoperability for Microwave Access Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things, a method, system, or computer-program product. Accordingly, the embodiments may take the form of a hardware embodiment, or an embodiment combining software and hardware. In some embodiments, the present invention takes the form of a computer-program product that includes computer-useable instructions embodied on one or more computer-readable media.

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
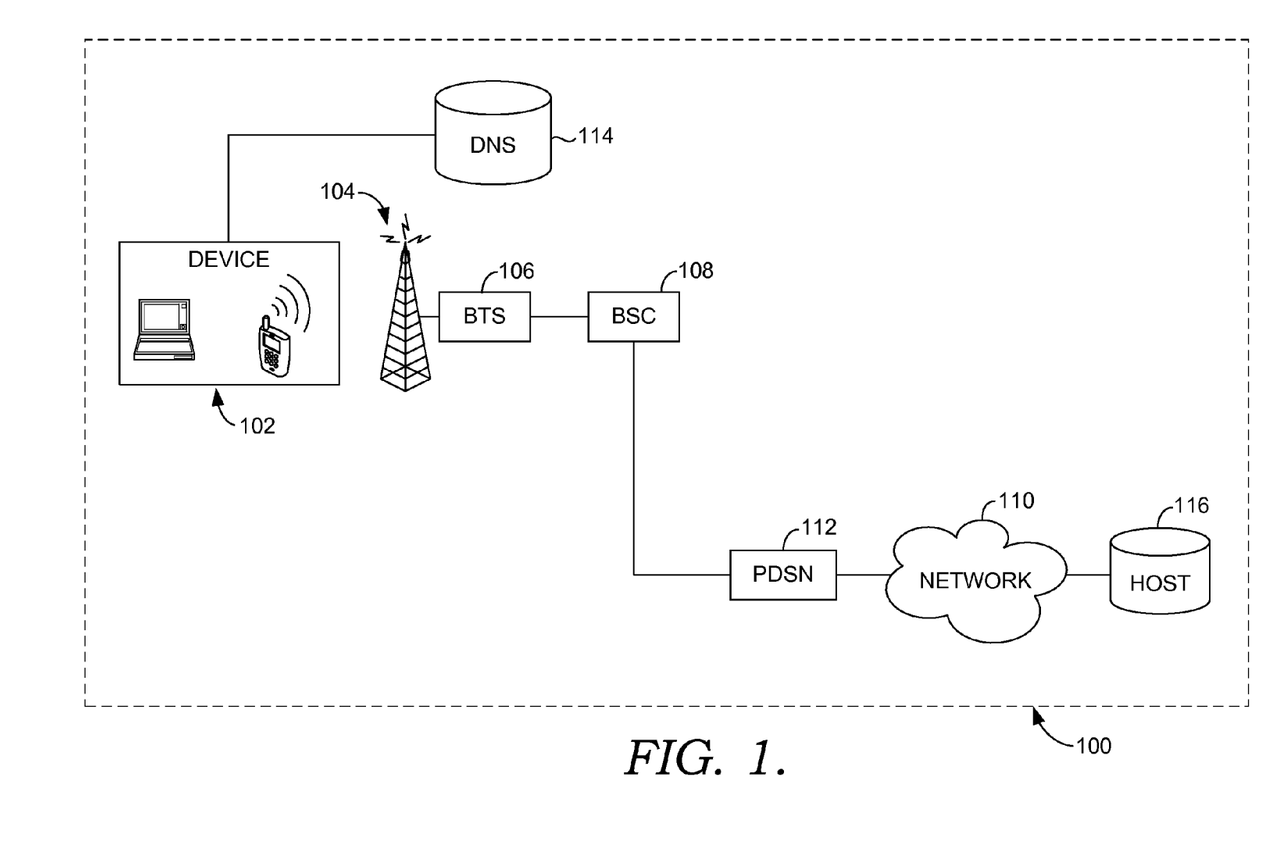
FIG. 1 is a schematic view of an exemplary communications environment suitable for use in implementing embodiments of the present invention.

Referring to the drawings in general, and initially to FIG. 1 in particular, an exemplary network environment suitable for use in implementing embodiments of the present invention is illustrated and designated generally as reference numeral 100. Network environment 100 is but one example of a suitable network environment and is not intended to suggest any limitation as to the scope of use or functionality of the invention. Neither should the network environment 100 be interpreted as having any dependency or requirement relating to any one or combination of components illustrated. In the network environment 100, for a device 102 to communicate with a host 116, the device 102 may communicate with a domain name server (DNS) 114 to obtain an Internet Protocol (IP) address of the host 116. The DNS 114 translates host names, e.g., domain names, into host addresses, e.g., IP addresses.

The device 102 communicates over established radio frequencies through a cell tower 104 having a base transceiver station (BTS) 106, a number of which are typically connected to a base station controller (BSC) 108. The BTS 106 may communicate over a wireless air interface with one or more devices, such as device 102, located in the wireless coverage area. The communication between the BTS 106 and the device 102 may occur in a digital format, such as CDMA, TDMA, GSM, 3G, 4G, or 802.11x, or may occur in an analog format, such as AMPS. The BSC 108 manages the communication between a number of BTSs 106 and a limited number of devices 102 compatible with the network environment 100.

Host 116 refers to any computing device that has two-way access to other computer devices on a network, such as the Internet, LAN, any IP-based network, or other public packet data network. Computing device 102 or the computing device used as host 116 may include any device that performs one or more computing functions including, but not limited to, mobile phones, personal digital assistants (PDAs), televisions, laptops, desktop computers, facsimile machines (FAX), digital versatile disk (DVD) players, servers, e.g., a web server, or any other computing device.

The device 102 may communicate with one or more networks 110, such as the Internet or an IP-based network, via a packet data serving node (PDSN) 112. PDSN 112 is a component of a CDMA2000 mobile network, but any network may be used. In the case of a GSM or UMTS network, the GPRS Gateway Support Node (GGSN) performs similar functions as PDSN 112. PDSN 112 may act as the connection point between the Radio Access and IP networks, and may be responsible for managing point-to-point protocol (PPP) sessions between the IP network provided by the mobile provider, and a mobile device. It may also connect BSC 108 to network 110, and may act as a network access server, providing a device access to network 110. In many instances, PDSN 112 may act as an access gateway providing simple IP and mobile IP access, foreign agent support, and packet transport for virtual private networking. In addition, PDSN 112 may act as a client for Authentication, Authorization, and Accounting (AAA) servers and may provide mobile stations with a gateway to the IP network. Alternatively or additionally, the network environment 100 may include other network elements for providing device access to network 110. The device 102 communicates with the host 116 via the network 110.

One skilled in the art will recognize that any network environment 100 having a network suitable for communicating between hosting devices, such as device 102 and host 116, may be utilized for implementing the present invention. Such a network environment 100 may, for example, utilize wireless technology or wired technology for network access. Wireless technology may include any wireless technology including, but not limited to 3G, 4G, WI-FI, WIMAX and the like. Wired technology includes, for example, wireline, DSL, and the like.

Figure 2:
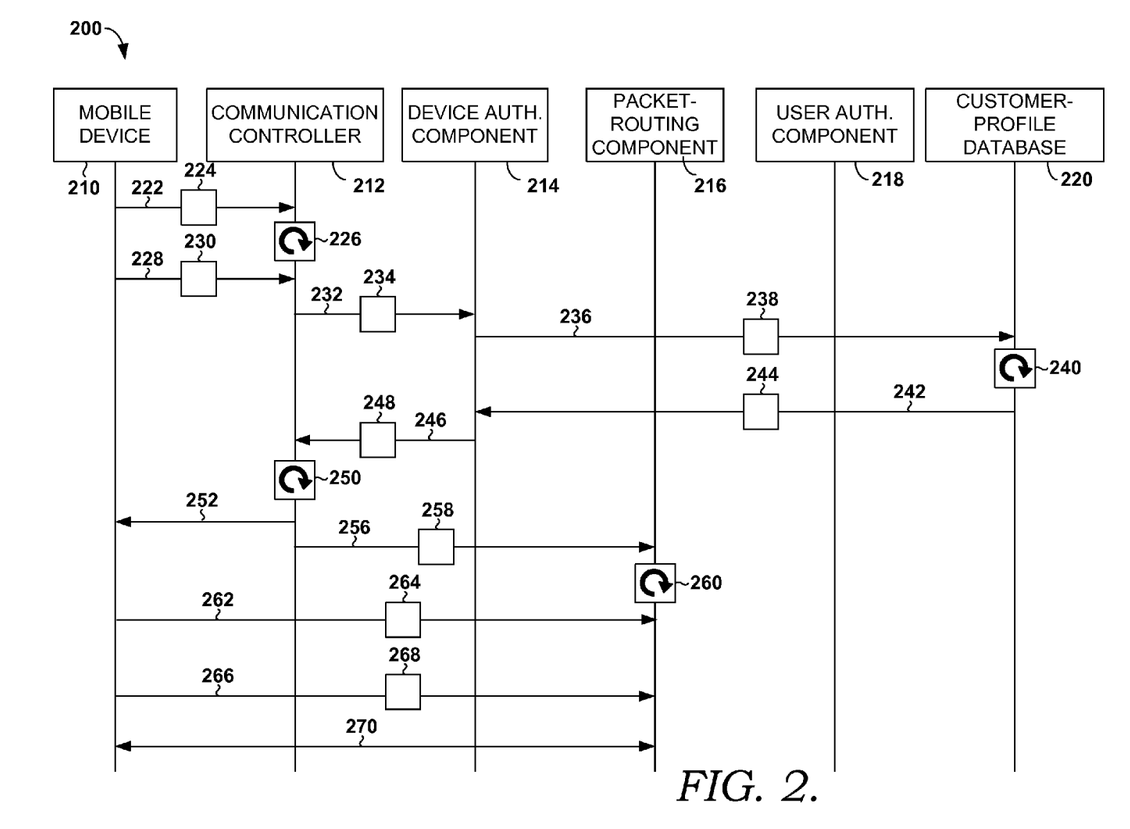
FIG. 2 depicts an illustrative flow diagram of a method for determining, prior to authentication of a mobile device, which Internet protocol (IP) versions with which the mobile device is authorized to communicate, according to an embodiment of the present invention.

Turning now to FIG. 2, an illustrative flow diagram of a method 200 is shown for determining, prior to authentication of a mobile device, which Internet protocol (IP) versions with which the mobile device is authorized to communicate, according to an embodiment of the present invention. Mobile devices may be capable of interpreting various Internet protocol (IP) versions, such as, for example, version 4 (IPv4) or version 6 (IPv6). IPv4 is the current generation of Internet Protocol, but for many reasons, including the prediction that we may run out of IPv4 addresses in the near future, IPv6 protocol has been developed to provide for an expanded address space.

IPv4 and IPv6, in many computing devices, may coexist. These computing devices are typically referred to as dual stack devices, as they are able to process both IPv4 and IPv6 packets. Mobile communication devices, such as, but not limited to cell phones or PDAs may be mobile IP capable. Mobile IP allows a user with a mobile device whose IP address is associated with one network to stay connected when moving to a network that has a different IP address. The user keeps the same IP address, even when roaming between IP networks. Mobile IP technology is embedded in the functionality of packet equipment for 2.5G and 3G networks.

With continued reference to FIG. 2, several components are illustrated, including a mobile device 210; a communication controller (e.g., radio network controller (RNC)) 212; a device authentication component (e.g., access network authentication, authorization, and accounting server (AN-AAA)) 214; a packet-routing component (e.g., packet data serving node (PDSN)) 216; a user authentication component (e.g., authentication, authorization, and accounting server (AAA)) 218; and a customer-profile database 220. Generally, the mobile device 210, in one embodiment, is a dual-stack mobile-communications device that is capable of interpreting both IPv4 and IPv6 requests. In some instances, the mobile device 210 may be capable of establishing communications, such as data communication sessions, using IPv4 and IPv6 simultaneously. The mobile device 210 may take the form of a variety of devices. For exemplary purposes only and not limitation, the mobile device 210 may take the form of a wireless communications device, such as a PDA or other handheld device.

The communication controller 212, generally, is responsible for controlling various aspects of communication between the different components and the device. In one embodiment, the communication controller 212 is an RNC, and carries out radio resource management, some of the mobility management functions and is the point where encryption is done before user data is sent to and from the mobile device 210. The device authentication component 214 is responsible for authenticating the mobile device 210. In one embodiment, the device authentication component 214 is an AN-AAA and may communicate with the communication controller 212 in the Access Network (AN) to enable authentication and authorization functions to be performed at the AN. The interface between AN and the device authentication component 214 is known as the A12 interface, which will be discussed in further detail below. The device authentication component 214 (e.g., AN-AAA) is generally responsible for authentication of the mobile device 210.

The packet-routing component 216 may be a PDSN, as described earlier, which is a packet data serving node, a component of a CDMA2000 mobile network. Embodiments of the present invention, however, may be used with a variety of networks, not just CDMA2000 mobile network. In the case of a GSM or UMTS network, the GPRS Gateway Support Node (GGSN) performs similar functions as a PDSN. Generally, the packet-routing component 216 acts as the connection point between the communication controller 212 and IP networks. This component is responsible for managing PPP sessions between the mobile provider's core IP network and the mobile station.

The user authentication component 218 (e.g., AAA) is a server that provides Internet protocol functionality to support the functions of authentication, authorization, and accounting and is generally responsible for authentication of the user of the mobile device 210. Authentication, as used herein, is a technique wherein the user gives credentials to the network so that the network may ensure the user's identity and also allows for accounting to be enabled so that the user may connect to the network and perform data transfers. Authorization, as used herein, refers to the granting of certain types of privileges, depending on a user's authentication, what privileges they are requesting, and the current system state. Accounting, as used herein, refers to the process of monitoring data transfers so that the end user may be charged for the usage.

Customer-profile database 220 may be any type of database that stores information relating to a user, such as, for example, services that the user is subscribed to, IP addresses, the type of phone that the user is currently using, the IP versions that the mobile device 210 is authorized to use, etc. The customer-profile database 220 may be queried by various components for this and other types of information stored in the database 220.

Initially, the mobile device 210 communicates 222 a request 224 to establish a connection to the communication controller 212. This connection, in some embodiments, may be made via Point-to-Point Protocol (PPP), and may be an air link connection, which allows the mobile device 210 to look like it is directly linked to the packet-routing component 216, even though it is connected over an air link, through a base station, and across a network, as further illustrated in FIG. 1. At step 226, the communication controller 212 establishes the air link connection. The mobile device 210 then communicates 228 a request 230 to the communication controller 212 for the mobile device 210 to be authenticated. The Challenge Handshake Authentication Protocol (CHAP) is typically used to authenticate IPv6 sessions but not for IPv4 sessions. CHAP is an authentication scheme used by PPP servers to validate the identity of remote clients for IPv6 sessions. The Link Control Protocol (LCP) is responsible for the PPP's overall successful operation, as it supervises and controls the PPP, and therefore the term PPP-LCP will be used herein.

The PPP-LCP may configure the request 230, prior to the communication controller 212 sending 232 an access-request 234 to the device authentication component 214 for device authorization. As previously mentioned, the device authentication component 214 is typically responsible for authentication and authorization of the mobile device 210. In one embodiment, the communication controller 212 additionally includes with the access-request 234 a request for the IP version(s) for which the mobile device 210 is authorized. This may be IPv4, IPv6, or both. An A12 interface may be used to send 232 or carry signaling information related to terminal authentication between the communication controller 212 and the device authentication component 214. The access-request may include a set of information that is used in order for the recipient of the information to make an accept or deny decision.

The device authentication component 214 then sends 236 a query 238 to the customer-profile database 220 to determine whether the user has valid credentials, in addition to querying for the IP version(s) for which the mobile device 210 is authorized. The customer-profile database 220 retrieves the requested data at step 240. As mentioned, the customer-profile database 220 may contain various types of information regarding users and mobile devices, including, but certainly not limited to, user credentials, IP versions that mobile devices are authorized to use, the International Mobile Station Identifier (IMSI), etc. The customer-profile database 220 may be queried for IP versions regardless of whether it was specifically requested for by the communication controller 212, such as by the A12 interface. In one embodiment, the customer-profile database 220 may not have the requested information, or may not support the functionality of storing and providing IP versions authorized when requested, and in these cases, the customer-profile database 220 may not send anything back to the device authentication component 214. In other embodiments, the customer-profile database 220 sends 242 an access-accept 244 back to the device authentication component 214, which includes the requested information.

The device authentication component 214, at step 246, sends the access-accept 248 back to the communication controller 212 so that the communication controller 212 knows the IP version(s) for which the mobile device 210 is authorized. In one embodiment, the communication controller 212 may not recognize or support the attribute associated with the IP version(s) sent, and thus may disregard or purge the information that was sent to it, and therefore the communication controller 212 determines whether it recognizes or supports the attribute, shown at step 250. At this point, the mobile device 210 has been properly authenticated, according to the method required for the IP version(s) that the mobile device 210 will use to establish an IP data session with a telecommunications network.

With continued reference to FIG. 2, the communication controller 212 communicates 252 to the mobile device 210 that the PPP setup is complete. The communication controller 212 then sends 256 the attribute(s) 258 corresponding to the IP versions for which the mobile device 210 is authorized to the packet-routing component 216, such that the packet-routing component 216 may cache this information at step 260. The packet-routing component 216 may use the cached information as logic for session processing. In one embodiment, the packet-routing component 216 may not recognize or support the attribute associated with the IP version(s) sent, and thus may disregard or purge the information that was sent to it. This information may be sent from the communication controller 212 to the packet-routing component 216 via an A11 interface, which generally carries signaling information between the packet control function (PCF) and the packet-routing component 216.

The mobile device 210 may then establish 262 a PPP link 264 with the packet-routing component 216, in one embodiment, by way of an A10 interface. The A10 interface, generally, carries user traffic between the PCF and the packet-routing component 216. The PPP-LCP then configures 266 the request 268, such that the packet-routing component 216 may use the value or attribute of the IP version(s) for which the mobile device 210 is authorized for session logic processing 270. Session logic processing ensures that only the authorized IP versions are allowed to become active. For example, if it was previously determined that the mobile device 210 is only authorized for IPv6, and an IPv4 session is requested, session logic processing, provided by the packet-routing component 216, disallows the IPv4 session to be authenticated and initiated.

Figure 3:
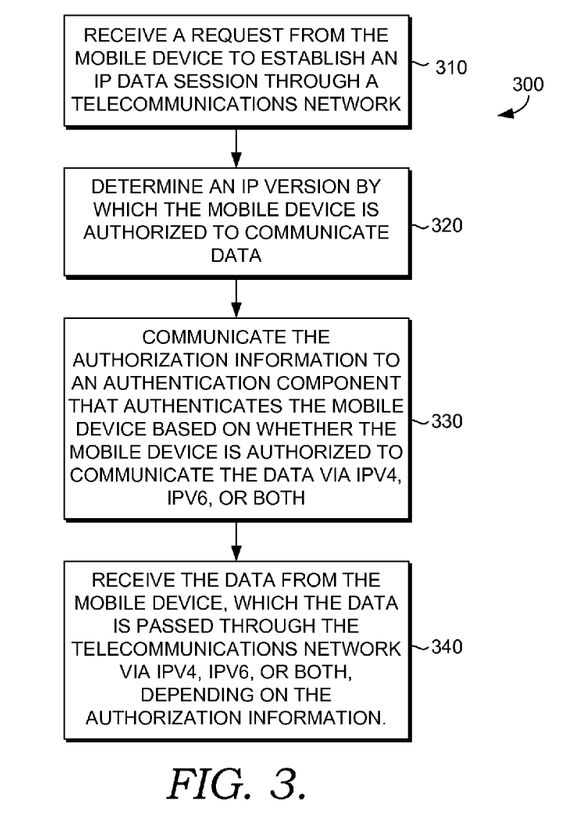
FIG. 3 is an exemplary flowchart depicting another method for enabling a mobile device to establish an IP data session through a telecommunications network, according to an embodiment of the present invention.

FIG. 3 is an exemplary flowchart depicting a method 300 for enabling a mobile device to establish an Internet protocol (IP) data session through a telecommunications network, according to an embodiment of the present invention. Initially, a request is received at step 310 from the mobile device to establish the IP data session through the telecommunications network. The request may initially come from the mobile device 210 itself when the device attempts to establish a connection (e.g., airlink connection) with the communication controller 212, such as an RNC. The communication controller 212 may then send a request, such as in the form of an access-request, to the device authentication component 214, requesting for the device to be authenticated.

In one instance, the communication controller 212 may include, along with the access-request, a request for the IP version(s) for which the mobile device 210 is authorized. In another instance, the communication controller 212 may not include this request, but it may be implied that the communication controller 212 requires the IP version(s) with which the mobile device 210 is authorized to communicate so that the communication controller 212 can send the appropriate information to other components for device authentication. The request from the communication controller 212 to the device authentication component 214, as mentioned, may be an access-request, which may be sent, in one embodiment, via an A12 interface. An A12 interface may be used to send or carry signaling information related to terminal authentication between the communication controller 212 and the device authentication component 214. Additionally, the access-request may include information such as an electronic serial number (ESN) associated with the mobile device 210, the International Mobile Station Identifier (IMSI), and potentially other device capabilities.

The purpose of embodiments of the present invention is for various components involved in authenticating a device to conserve resources and perform authentication steps that are appropriate only for the IP version(s) that the device will be using to establish an IP data session with the telecommunications network.

At step 320, an IP version is determined by which the mobile device is authorized to communicate data. In making this determination, a request to authenticate the mobile device may be received. This request may, in one embodiment, come from the communication controller 212 via the A12 interface discussed above. Further, authorization information in a customer-profile database may be inspected to determine whether the mobile device is authorized to communicate data via IPv4, IPv6, or both. In one embodiment, the authorization information may also include whether the device is authorized to access the telecommunications network. The customer-profile database may store various types of information relating to a user and/or a device that is associated with the user. A query may be sent to the customer-profile database such that it can be inspected to determine authorization information for the mobile device, as previously discussed.

At step 330, the authorization information is communicated to an authentication component, such as the device authentication component 214 in FIG. 2. The authentication component, using the authorization information, may then authenticate the device based on whether the mobile device is authorized to communicate the data via IPv4, IPv6, or both, as determined at step 320. As previously mentioned, the authorization information may specify whether the device is authorized for IPv4, IPv6, or both. If the authorization information indicates that the device is authorized to communicate data via IPv4 only and not IPv6, the authentication device will trigger and will initiate only those steps required for IPv4. If, however, the authorization information indicates that the device is authorized to communicate data via IPv6 only and not IPv4, the authentication device will trigger, and will initiate only those steps required for IPv6, and thus will not exhaust unnecessary resources attempting to authenticate the device for IPv4.

In one embodiment, the authentication component may perform authentication steps for both IPv4 and IPv6 if the authorization information indicates that the device is authorized for both IPv4 and IPv6. It may be determined, for example, whether IPv4 or IPv6 authentication will occur first, and that authentication process will be triggered. In a further embodiment, the two authentication processes may be simultaneously triggered, and the steps may be performed at the same time. In yet another embodiment, only one authentication may occur, allowing for both IPv4 and IPv6 data sessions to commence. The authorization information, in one embodiment, may include whether the user of the device has valid credentials, or whether the device is authorized to access a particular network, as this information is typically stored in the customer-profile database 220.

With continued reference to FIG. 3, the data is received from the mobile device at step 340, in which the data is passed through the telecommunications network via IPv4, IPv6, or both, depending on the authorization information. At this point, an IP data session is now initiated, allowing the mobile device to transfer and receive data through the telecommunications network.

Figure 4:
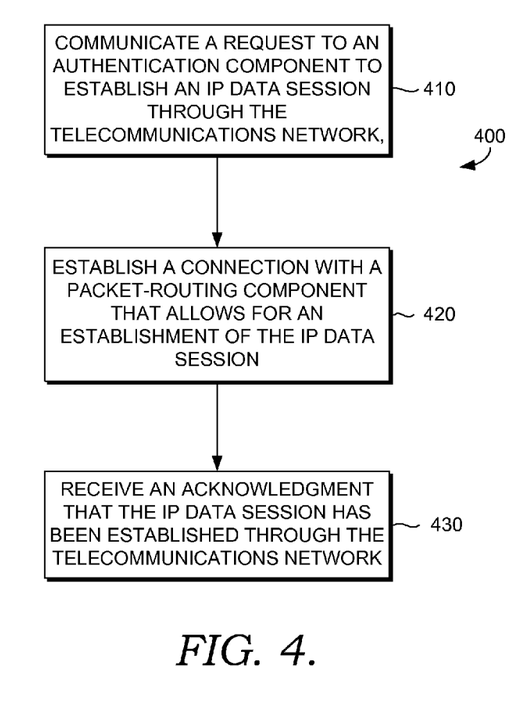
FIG. 4 is an exemplary flowchart depicting another method for enabling a mobile device to establish an IP data session through a telecommunications network, according to an embodiment of the present invention.

Referring now to FIG. 4, an exemplary flowchart is depicted showing a method 400 for enabling a mobile device to establish an Internet protocol (IP) data session through a telecommunications network, according to another embodiment of the present invention. Initially, at step 410, a request is communicated to an authentication component, such as the device authentication component 214 in FIG. 2, to establish an IP data session through the telecommunications network. The authentication component may determine an IP version by which the mobile device is authorized to communicate data. This may be determined by first inspecting authorization information in a customer-profile database to determine whether the mobile device is authorized to communicate data via IPv4, IPv6, or both. Further, the authorization information may be communicated to an authentication component that authenticates the mobile device based on whether the mobile device is authorized to communicate the data via IPv4, IPv6, or both. As mentioned, the authentication component (e.g., device authentication component 214), prior to authenticating the device, may inspect, by querying, for instance, a customer-profile database, such as the customer-profile database 220, to determine authorization information for the device. The authorization information may include, in one embodiment, whether the device is authorized for IPv4, IPv6, or both. Based on the authorization information, the device can be properly authenticated, eliminating the need for unnecessary resources.

As mentioned above, the mobile device 210 may first attempt to establish a connection to the communication controller 212 (e.g., RNC). In one embodiment, the connection may be an airlink connection and may use PPP to establish the connection. LCP may then configure the request, such that the communication controller 212 is aware that the mobile device 210 is requesting authentication such that an IP data session may be established. The device may receive an indication that the PPP setup is complete.

At step 420, a connection is established with a packet-routing component, such as packet-routing component 216, that allows for an establishment of the IP data session. The packet-routing component, in one embodiment, may have been sent the authorization information, such that the packet-routing component is already aware as to whether the device will be authenticated for IPv4, IPv6, or both. The authorization information may be sent to the packet-routing component via an A11 interface, which sends the authorization information to the packet-routing component so that the packet-routing component can cache the information and use it as logic for IP data session procession. The connection may be direct, and may be established using an A10 interface in one embodiment, wherein the mobile device establishes a PPP link with the packet-routing component. Generally, the A10 interface carries user traffic between the PCF and the packet-routing component 216.

In one instance, the packet-routing component may not recognize or support the attribute that it is sent, which corresponds to the authorization information. In this instance, the packet-routing component may disregard or purge the information that was sent to it. An acknowledgment is received at step 430 by the mobile device that the IP data session has been established through the telecommunications network. This acknowledgment allows the device to know that it has been properly authenticated for the IP version(s) for which it has been authorized. This acknowledgment may take the form of the device having initiated the IP data session.

Figure 5:
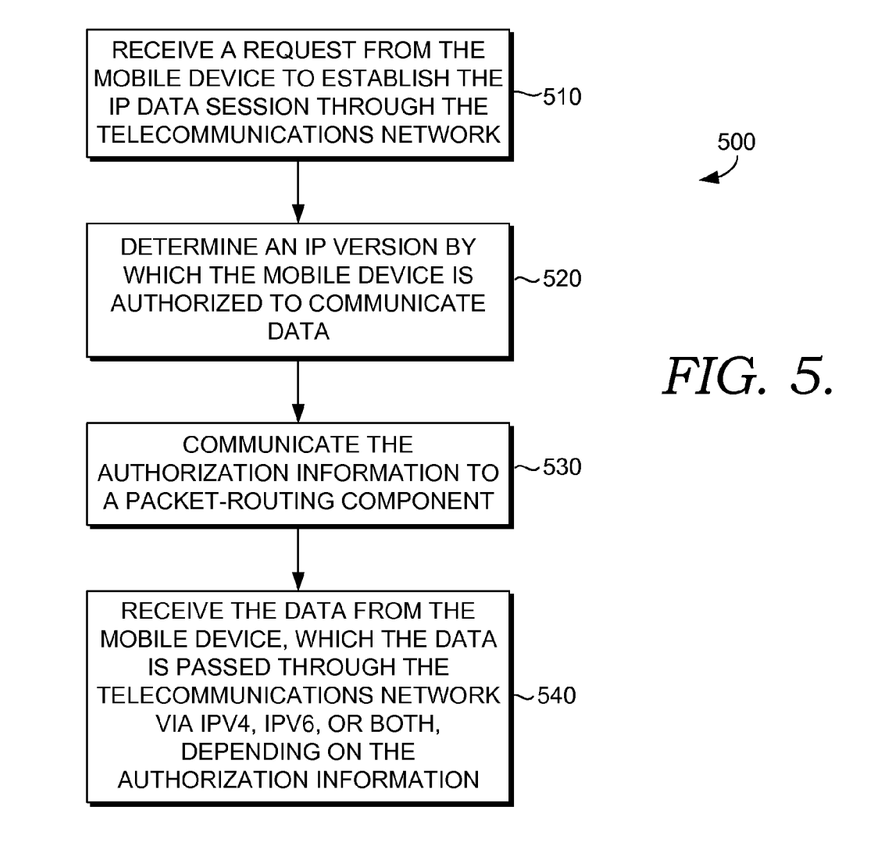
FIG. 5 is an exemplary flowchart depicting a method for enabling a mobile device to establish an IP data session through a telecommunications network, according to an embodiment of the present invention.

Turning to FIG. 5, an exemplary flowchart is depicted showing a method 500 for enabling a mobile device to establish an Internet protocol (IP) data session through a telecommunications network, according to another embodiment of the present invention. At step 510, a request is received from the mobile device to establish the IP data session through the telecommunications network. An IP version, at step 520, is determined by which the mobile device is authorized to communicate data. This determination may be made by communicating the request to a querying component that inspects authorization information in a customer-profile database, such as customer-profile database 220, to determine whether the mobile device is authorized to communicate data via IPv4, IPv6, or both. This may occur prior to the completion of the authentication process to eliminate unnecessary resources in attempting to authenticate an IP version for which the mobile device is not authorized.

In some instances, a device may be authorized for both IPv4 and IPv6. These IP version capabilities are received by the device authentication component 214, for example. As previously mentioned, IPv4 and IPv6 require different steps for authentication, and therefore it is valuable to know which IP version the device is authorized for prior to beginning the version-specific steps, so as not to waste resources of the various components used for authentication.

The authorization information, including whether the mobile device is authorized for IPv4, IPv6, or both, may be received from the querying component, and the mobile device may be authenticated based on the authorization information. In one embodiment, if the authorization information indicates that the mobile device is authorized to communicate via IPv4 only, the mobile device will be authenticated for IPv4 only. In another embodiment, if the authorization information indicates that the mobile device is authorized to communicate via IPv6 only, the mobile device will be authenticated for IPv6 only, thus eliminated unnecessary resources in initiating an authentication process for an IP version that is not authorized for that particular mobile device. In yet another embodiment, some devices may be authorized to communicate via both IPv4 and IPv6. In one instance, two separate authentication processes may occur. But, in another instance, one authentication process (e.g., for either IPv4 or IPv6) may occur, and may allow for both IP versions to communicate data.

The IP version capabilities and other authorization information may be communicated or sent to the communication controller 212, which may then transfer the information to the packet-routing component 216, shown at step 530. The packet-routing component 216 may cache this authorization information so that the authorization information can be used for session logic processing during the IP data session through the telecommunications network.

With continued reference to FIG. 5, at step 540, the data is received from the mobile device, in which the data is passed through the telecommunications network via IPv4, IPv6, or both, depending on the authorization information. This may indicate that an IP data session(s) has commenced.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions embodied thereon for performing a method for enabling a mobile device to establish an Internet protocol (IP) data session through a telecommunications network, the method comprising:
   receiving a request from the mobile device to establish the IP data session through the telecommunications network;
   prior to authenticating the mobile device, determining an IP version by which the mobile device is authorized to communicate data, wherein the determining includes,
      receiving a request to authenticate the mobile device, and inspecting authorization information in a customer-profile database to determine whether the mobile device is authorized to communicate data via IPv4, IPv6, or both;
   communicating the authorization information to an authentication component that authenticates the mobile device based on whether the mobile device is authorized to communicate the data via IPv4, IPv6, or both;
   establishing a connection with a packet-routing component that allows for an establishment of the IP data session, wherein the packet routing component has been sent and has cached the authorization information for use during session logic processing to disallow the respective IP version by which the mobile device is not authorized to communicate data though the telecommunications network; and
   receiving the data from the mobile device, which the data is passed through the telecommunications network via IPv4, IPv6, or both, depending on the authorization information.

2. The media of claim 1, wherein the request to authenticate the device is received from a radio network controller (RNC) in the form of an access-request.

3. The media of claim 2, wherein the access-request additionally includes a request for whether the device is authorized for IPv4, IPv6, or both.

4. The media of claim 2, wherein the access-request additionally includes an electronic serial number (ESN) that uniquely identifies the device.

5. The media of claim 1, wherein the authorization information further includes whether a user of the device has valid credentials.

6. The media of claim 1, wherein the authorization information further includes whether the device is authorized to access the telecommunications network.

7. The media of claim 1, wherein the request to authenticate the device is received via an A12 interface.

8. The media of claim 1, further comprising if the authorization information indicates that the device is authorized for IPv4 only, triggering an IPv4 authentication process for the device.

9. The media of claim 1, further comprising if the authorization information indicates that the device is authorized for IPv6 only, triggering an IPv6 authentication process for the device.

10. The media of claim 1, further comprising:
   if the authorization information indicates that the device is authorized for both IPv4 and IPv6, determining whether an IPv4 authentication process or an IPv6 authentication process should first be triggered;
   if it is determined that the IPv4 authentication process should first be triggered, then triggering the IPv4 authentication process for the device; and
   if it is determined that the IPv6 authentication process should first be triggered, then triggering the IPv6 authentication process for the device.

11. One or more non-transitory computer-readable media having computer-useable instructions embodied thereon for performing a method for enabling a mobile device to establish an Internet protocol (IP) data session through a telecommunications network, the method comprising:
   communicating a request to an authentication component to establish an IP data session through the telecommunications network, wherein, prior to authenticating the mobile device, the authentication component determines an IP version by which the mobile device is authorized to communicate data by,
      (1) inspecting authorization information in a customer-profile database to determine whether the mobile device is authorized to communicate data via IPv4, IPv6, or both, and
      (2) communicating the authorization information to an authentication component that authenticates the mobile device based on whether the mobile device is authorized to communicate the data via IPv4, IPv6, or both;
   establishing a connection with a packet-routing component that allows for an establishment of the IP data session, wherein the packet-routing component has been sent and has cached the authorization information for use during session logic processing to disallow the respective IP version by which the mobile device is not authorized to communicate data through the telecommunication network; and receiving an acknowledgment that the IP data session has been established through the telecommunications network.

12. The media of claim 11, further comprising establishing an airlink connection to a radio network controller (RNC).

13. The media of claim 12, wherein the airlink connection is established via Point-to-Point Protocol (PPP).

14. The media of claim 11, further comprising receiving an indication that Point-to-Point Protocol (PPP) setup has been completed.

15. The media of claim 11, wherein the connection with the packet-routing component is established via a Point-to-Point Protocol (PPP) link.

16. The media of claim 11, wherein the packet-routing component uses the authorization information for session logic processing.

17. One or more computer-readable media having computer-useable instructions embodied thereon for performing a method for enabling a mobile device to establish an Internet protocol (IP) data session through a telecommunications network, the method comprising:

receiving a request from the mobile device to establish the IP data session through the telecommunications network;

prior to authenticating the mobile device, determining an IP version by which the mobile device is authorized to communicate data, wherein the determining includes, (1) communicating the request to a querying component that inspects authorization information in a customer-profile database to determine whether the mobile device is authorized to communicate data via IPv4, IPv6, or both, (2) receiving the authorization information from the querying component, and (3) authenticating the mobile device based on the authorization information;

communicating the authorization information to a packet-routing component that caches the authorization information so that the authorization information can be used by the packet-routing component during the IP data session for session logic processing to disallow the respective IP version by which the mobile device is not authorized to communicate data through the telecommunications network; and receiving the data from the mobile device, which the data is passed through the telecommunications network via IPv4, IPv6, or both, depending on the authorization information.

18. The media of claim 17, further comprising receiving an indication of the one or more IP version capabilities for which the device is authorized.

19. The media of claim 17, wherein the request to the querying component is made via an A12 interface.

20. The media of claim 17, further comprising communicating to the mobile device that the Point-to-Point Protocol (PPP) setup has been completed.

* * * * *